United States Patent
Bamesberger

(10) Patent No.: US 10,754,078 B2
(45) Date of Patent: Aug. 25, 2020

(54) LIGHT SOURCE, A SHAPING SYSTEM USING THE LIGHT SOURCE AND AN ARTICLE MANUFACTURING METHOD

(71) Applicant: CANON KABUSHIKI KAISHA, Tokyo (JP)

(72) Inventor: Seth J. Bamesberger, Austin, TX (US)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/227,281

(22) Filed: Dec. 20, 2018

(65) Prior Publication Data
US 2020/0200959 A1 Jun. 25, 2020

(51) Int. Cl.
*G02B 27/09* (2006.01)
*F21V 8/00* (2006.01)

(52) U.S. Cl.
CPC ......... *G02B 6/0016* (2013.01); *G02B 6/0031* (2013.01); *G02B 27/0977* (2013.01)

(58) Field of Classification Search
CPC .... G03F 7/0002; G03F 7/2047; G03F 7/7035; G02B 6/0061; G02B 6/0031; G02B 6/0036; G02B 6/0021; G02B 6/0043; G02B 6/0016; G02B 27/0977
See application file for complete search history.

(56) References Cited

U.S. PATENT DOCUMENTS

| | | | |
|---|---|---|---|
| 6,671,034 B1 | 12/2003 | Hatakeyama et al. | |
| 6,936,194 B2 | 8/2005 | Watts | |
| 6,979,112 B2 | 12/2005 | Yu et al. | |
| 7,157,036 B2 | 1/2007 | Choi et al. | |
| 8,066,930 B2 | 11/2011 | Sreenivasan et al. | |
| 8,076,386 B2 | 12/2011 | Xu et al. | |
| 8,092,959 B2 | 1/2012 | Beck | |
| 8,237,133 B2 | 8/2012 | Ganapathisubramanian et al. | |
| 8,349,241 B2 | 1/2013 | Sreenivasan et al. | |
| 2004/0095743 A1* | 5/2004 | Yu | G02B 6/0036 362/613 |

(Continued)

FOREIGN PATENT DOCUMENTS

EP  1001311 A1  5/2000
JP  2008-183810 A  8/2008

(Continued)

OTHER PUBLICATIONS

Okayama et al. Fabrication of Ultraviolet Range Light Guide Plate, 2008 Intl Symposium on Micro-NanoMechatronics and Human Science, Nagoya, JP, 2008, pp. 408-413, IEEE, NY.

*Primary Examiner* — Steven Whitesell Gordon
(74) *Attorney, Agent, or Firm* — Daniel Ratoff

(57) ABSTRACT

A light source, a shaping system using the light source, and a method of using the light source in a shaping system. The light source may comprise one or more actinic energy sources; and a light guide plate. The light guide plate may have at least: a light output face; an input edge; and a back surface facing opposite the light output face. Wherein, the input edge of the light guide plate may be arranged to receive UV light from the one or more actinic energy sources. Wherein, the light guide plate may have a plurality of scattering features that are configured to scatter UV light received from the input edge. Wherein, the back surface may reflect UV light towards the light output face and is transparent to non-UV light.

20 Claims, 8 Drawing Sheets

(56) References Cited

U.S. PATENT DOCUMENTS

| | | | |
|---|---|---|---|
| 2004/0115568 A1 | 6/2004 | Schmidt | |
| 2009/0317727 A1* | 12/2009 | Beck | B82Y 10/00 430/5 |
| 2010/0090130 A1* | 4/2010 | Ganapathisubramanian | B82Y 10/00 250/492.1 |
| 2012/0127725 A1* | 5/2012 | Lin | G02B 5/045 362/293 |
| 2014/0064660 A1* | 3/2014 | Huang | G02B 6/0036 385/31 |
| 2014/0126239 A1* | 5/2014 | Huang | F21V 7/04 362/609 |
| 2014/0339734 A1* | 11/2014 | Murakami | G03F 7/0002 264/293 |
| 2019/0302620 A1* | 10/2019 | Donahue | G02B 6/0051 |

FOREIGN PATENT DOCUMENTS

| | | |
|---|---|---|
| JP | 2012-169498 A | 9/2012 |
| WO | WO-2010/095614 | 8/2010 |

* cited by examiner

LIGHT SOURCE, A SHAPING SYSTEM USING THE LIGHT SOURCE AND AN ARTICLE MANUFACTURING METHOD

BACKGROUND

Field of Art

The present disclosure relates to a light source, a shaping system that uses the light source, an article manufacturing method.

Description of the Related Art

Nano-fabrication includes the fabrication of very small structures that have features on the order of 100 nanometers or smaller. One application in which nano-fabrication has had a sizeable impact is in the fabrication of integrated circuits. The semiconductor processing industry continues to strive for larger production yields while increasing the circuits per unit area formed on a substrate. Improvements in nano-fabrication include providing greater process control and/or improving throughput while also allowing continued reduction of the minimum feature dimensions of the structures formed.

One nano-fabrication shaping technique in use today is commonly referred to as nanoimprint lithography. Nanoimprint lithography is useful in a variety of applications including, for example, fabricating one or more layers of integrated devices. Examples of an integrated device include but are not limited to CMOS logic, microprocessors, NAND Flash memory, NOR Flash memory, DRAM memory, MRAM, 3D cross-point memory, Re-RAM, Fe-RAM, STT-RAM, MEMS, and the like. Exemplary nanoimprint lithography systems and processes are described in detail in numerous publications, such as U.S. Pat. Nos. 8,349,241, 8,066,930, and 6,936,194, all of which are hereby incorporated by reference herein.

The nanoimprint lithography technique disclosed in each of the aforementioned patents describes the formation of a relief pattern in a formable material (polymerizable) layer and transferring a pattern corresponding to the relief pattern into and/or onto an underlying substrate. The patterning process uses a template spaced apart from the substrate and a formable material is applied between the template and the substrate. The formable material is solidified by exposing the formable material to UV light from a high power lamp or laser so as to form a solid layer that has a pattern conforming to a shape of the surface of the template that is in contact with the formable liquid. After solidification, the template is separated from the solidified layer such that the template and the substrate are spaced apart. The substrate and the solidified layer are then subjected to additional processes, such as etching processes, to transfer a relief image into the substrate that corresponds to the pattern in the solidified layer. The patterned substrate can be further subjected to known steps and processes for device (article) fabrication, including, for example, curing, oxidation, layer formation, deposition, doping, planarization, etching, formable material removal, dicing, bonding, and packaging, and the like.

SUMMARY

A first embodiment, may be a light source. The light source may comprise one or more actinic energy sources; and a light guide plate. The light guide plate may have at least: a light output face; an input edge; and a back surface facing opposite the light output face. The input edge of the light guide plate may be arranged to receive UV light from the one or more actinic energy sources. The light guide plate may have a plurality of scattering features that are configured to scatter UV light received from the input edge. The back surface may reflect UV light towards the light output face and is transparent to non-UV light.

In an aspect of the first embodiment, the UV light may be scattered out of a first portion of the light output face but not out of a second portion of the light output face.

In an aspect of the first embodiment, the shape of the first portion of the light output face may correspond to an imprint field on a retained substrate.

In an aspect of the first embodiment, a transmission efficiency of the light guide plate may be a percentage of the UV light that exits the light output face relative to UV light received by the input edge, and the transmission efficiency is greater than 80%.

In an aspect of the first embodiment, the scattering features may be on one or both of the light output face and the back surface.

In an aspect of the first embodiment, the non-UV light may be one or both of visible light and heat irradiation.

In an aspect of the first embodiment, the light guide plate may be made of one material from a group of materials consisting of: poly(methyl methacrylate) glass; polycarbonate; fused silica; and glass.

In an aspect of the first embodiment, the plurality of scattering features may be selected from a scattering features group consisting of: v-cuts, bumps, protrusions, and indentations, and are in one or both of the light output face and the back surface of the light guide plate.

In an aspect of the first embodiment, the plurality of scattering features may be dots printed on one or both of the light output face and the back surface of the light guide plate.

A second embodiment, may be a shaping system that comprises: a template chuck configured to hold a template; a substrate chuck configured to hold a substrate; a positioning system configured to bring the template into contact with formable material on the substrate; and a light source. The light source may comprise one or more actinic energy sources; and a light guide plate. The light guide plate may have at least: a light output face; an input edge; and a back surface facing opposite the light output face. The input edge of the light guide plate may be arranged to receive UV light from the one or more actinic energy sources. The light guide plate may have a plurality of scattering features that are configured to scatter UV light received from the input edge. The back surface may reflect UV light towards the light output face and is transparent to non-UV light. The scattering features on the light guide plate may be configured to send UV light towards the formable material on the substrate.

In an aspect of the second embodiment, the template may be both featureless and the same size or larger than the substrate.

In an aspect of the second embodiment, the template chuck may be transparent to UV light.

In an aspect of the second embodiment, the template has a patterning surface that is the same size or smaller than the substrate and the scattering features are configured to send the UV light through the patterning surface of the template.

In an aspect of the second embodiment, the template chuck may include an opening that may be the same size or larger than the patterning surface of the template. The scattering features may be configured to send the UV light through the opening in the template chuck.

The second embodiment, may further comprise a heat irradiation light source that is configured to produce a heat irradiation pattern which is guided through both the back surface of the light guide plate, and the light output face of the light guide plate, and is absorbed by the template held in the template chuck.

In an aspect of the second embodiment, the heat irradiation light source may be configured to adjust a spatiotemporal distribution of heat irradiation.

The second embodiment, may further comprise a spread camera positioned to receive visible light from the formable material under the template which has passed through the light output face and the back surface of the light guide plate.

In an aspect of the second embodiment, the arrangement of the scattering features may provide for transmission of a lower intensity of UV light at a center of the retained substrate and the relatively higher intensity of UV light at a periphery of the retained substrate.

The second embodiment, may further comprise a dispenser configured to dispense formable material onto the substrate prior to the template being brought into contact with the substrate.

A third embodiment, may be a method of manufacturing an article. The method may comprise: contacting formable material on a substrate with a template; providing a light guide plate that may have at least: a light output face; an input edge; and a back surface facing opposite the light output face, wherein the back surface being transparent to non-UV light producing UV light with one or more actinic energy source, which is then received by the input edge of the light guide, then scattered by a plurality of scattering features of the light guide, reflected off the back surface of the light guide, out of the light output face of the light guide, thru the template, and is absorbed by the formable material; separating the template from the cured formable material; and processing the substrate on which the pattern has been formed to manufacture the article.

These and other objects, features, and advantages of the present disclosure will become apparent upon reading the following detailed description of exemplary embodiments of the present disclosure, when taken in conjunction with the appended drawings, and provided claims.

BRIEF DESCRIPTION OF DRAWINGS

So that features and advantages of the present invention can be understood in detail, a more particular description of embodiments of the invention may be had by reference to the embodiments illustrated in the appended drawings. It is to be noted, however, that the appended drawings only illustrate typical embodiments of the invention, and are therefore not to be considered limiting of its scope, for the invention may admit to other equally effective embodiments.

Figure 1:
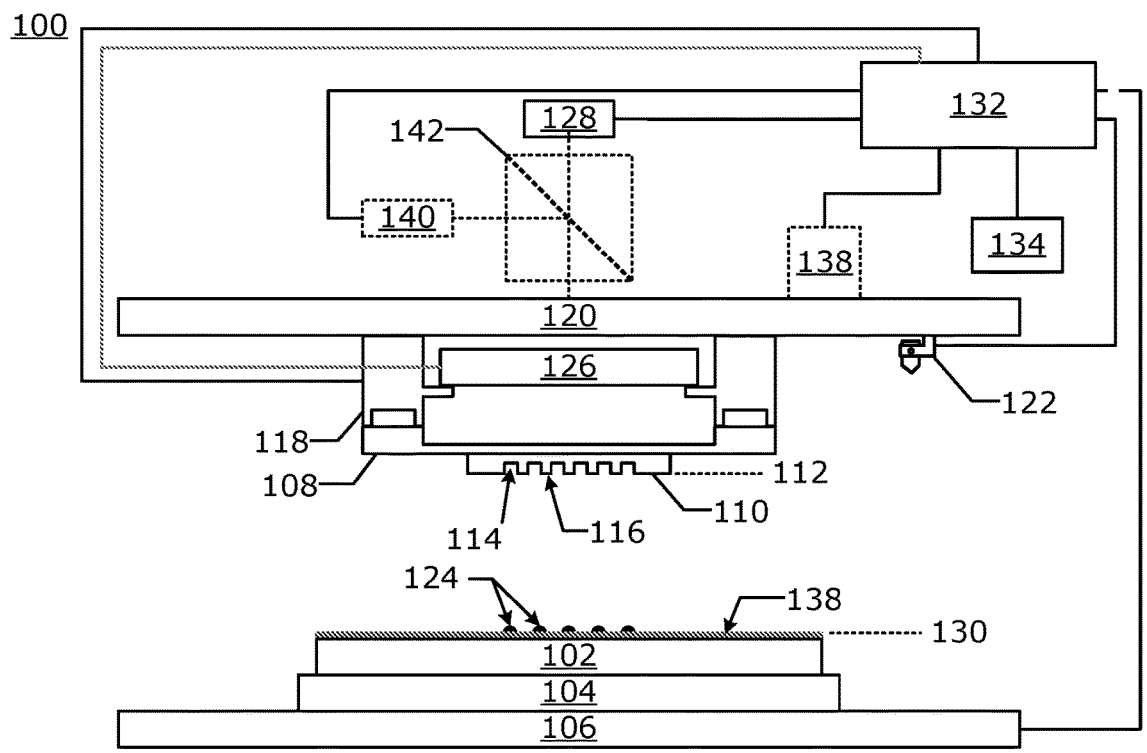
FIG. 1 is an illustration of an exemplary nanoimprint lithography system having a template with a mesa spaced apart from a substrate as used in an embodiment.

Throughout the figures, the same reference numerals and characters, unless otherwise stated, are used to denote like features, elements, components or portions of the illustrated embodiments. Moreover, while the subject disclosure will now be described in detail with reference to the figures, it is done so in connection with the illustrative exemplary embodiments. It is intended that changes and modifications can be made to the described exemplary embodiments without departing from the true scope and spirit of the subject disclosure as defined by the appended claims.

DETAILED DESCRIPTION

Nanoimprint systems may make use of a UV light source which supplies actinic radiation that is guided to the formable material that is between the substrate and the template.
Nanoimprint System FIG. 1 is an illustration of a nanoimprint lithography system 100 in which an embodiment may be implemented. The nanoimprint lithography system 100 is used to form a relief pattern on a substrate 102. The substrate 102 may be coupled to a substrate chuck 104. The substrate chuck 104 may be but is not limited to a vacuum chuck, pin-type chuck, groove-type chuck, electrostatic chuck, electromagnetic chuck, and/or the like.

The substrate 102 and the substrate chuck 104 may be further supported by a substrate positioning stage 106. The substrate positioning stage 106 may provide translational and/or rotational motion along one or more of the x, y, z, θ, ψ, and φ-axes. The substrate positioning stage 106, the substrate 102, and the substrate chuck 104 may also be positioned on a base (not shown). The substrate positioning stage may be a part of a positioning system.

Spaced-apart from the substrate 102 is a template 108. The template 108 may include a body having a mesa (also referred to as a mold) 110 extending towards the substrate 102 on a front side of the template 108. The mesa 110 may have a patterning surface 112 thereon also on the front side of the template 108. Alternatively, the template 108 may be formed without the mesa 110, in which case the surface of the template facing the substrate 102 is equivalent to the mold 110 and the patterning surface 112 is that surface of the template 108 facing the substrate 102.

The template 108 may be formed from such materials including, but not limited to, fused-silica, quartz, silicon, organic polymers, siloxane polymers, borosilicate glass, fluorocarbon polymers, metal, hardened sapphire, and/or the like. The patterning surface 112 may comprise features defined by a plurality of spaced-apart template recesses 114 and/or template protrusions 116. The patterning surface 112 defines a pattern that forms the basis of a pattern to be formed on the substrate 102. In an alternative embodiment, the patterning surface 112 is featureless in which case a planar surface is formed on the substrate.

Template 108 may be coupled to a template chuck 118. The template chuck 118 may be, but is not limited to, vacuum chuck, pin-type chuck, groove-type chuck, electrostatic chuck, electromagnetic chuck, and/or other similar chuck types. The template chuck 118 may be configured to apply stress, pressure, and/or strain to template 108 that varies across the template 108. One or more actuators (for example piezoelectric actuators, pneumatic actuators, etc.) may be used to squeeze and/or pull at the edges or other portions of the template.

The template chuck 118 may be coupled to an imprint head which in turn may be moveably coupled to a bridge 120 such that the template chuck 118, the imprint head, and the template 108 are moveable in at least the z-axis direction, and potentially other directions (e.g. x, y, θ, and φ-axes). The positioning system may include one or more motors which move template 108.

Nanoimprint lithography system 100 may further comprise a fluid dispenser 122. The fluid dispenser 122 may also be moveably coupled to the bridge 120. In an embodiment, the fluid dispenser 122 and the template chuck 120 share one or more positioning components. In an alternative embodiment, the fluid dispenser 122 and the template chuck 120 move independently from each other.

The fluid dispenser 122 may be used to deposit liquid formable material 124 (e.g., polymerizable material) onto the substrate 102 in a pattern. Additional formable material 124 may also be added to the substrate 102 using techniques, such as, drop dispense, spin-coating, dip coating, chemical vapor deposition (CVD), physical vapor deposition (PVD), thin film deposition, thick film deposition, and/or the like. The formable material 124 may be dispensed upon the substrate 102 before and/or after a desired volume is defined between the mold 112 and the substrate 102 depending on design considerations. The formable material 124 may comprise a mixture including a monomer as described in U.S. Pat. Nos. 7,157,036 and 8,076,386, both of which are herein incorporated by reference.

Different fluid dispensers 122 may use different technologies to dispense formable material 124. When the formable material 124 is jettable, ink jet type dispensers may be used to dispense the formable material. For example, thermal ink jetting, microelectromechanical systems (MEMS) based ink jetting, valve jet, and piezoelectric ink jetting are common techniques for dispensing jettable liquids.

The nanoimprint lithography system 100 further includes a UV light source 126 that directs actinic energy along an exposure path. In an embodiment, the exposure path is a straight line and the UV light source 126 is positioned above the template chuck 118. In an alternative embodiment, the exposure path includes one or more components that bend and/or turn the exposure path. The imprint head and the substrate positioning stage 106 may be configured to position the template 108 and the substrate 102 in superimposition with the exposure path.

The nanoimprint lithography system 100 may further comprise a spread camera 128 that is positioned to image the formable material 124 on the substrate 102. The spread camera 128 includes one or more of a CCD, a camera, a line camera, and/or a photodetector. The spread camera 128 may also include one or more optical components such as a lenses, mirrors, apertures, filters, prisms, polarizers, windows, adaptive optics, and/or light sources. The spread camera 128 may be configured to detect non-UV light (for example visible light 400 nm-700 nm). The spread camera 128 may be a monochromatic camera.

The nanoimprint lithography system 100 may further comprise an droplet inspection system 138 that is separate from the spread camera 128. The droplet inspection system 138 may include one or more of a CCD, a camera, a line camera, and/or a photodetector. The droplet inspection system 138 may include one or more optical components such as a lenses, mirrors, apertures, filters, prisms, polarizers, windows, adaptive optics, and/or light sources. The droplet inspection system 138 may be positioned to inspect droplets prior to the patterning surface 112 contacting the formable material 124 on the substrate 102.

Prior to the formable material 124 being dispensed onto the substrate, a substrate coating 136 may be applied to the substrate 102. In an embodiment, the substrate coating 136 is an adhesion layer. In an embodiment, the substrate coating 136 may be applied to the substrate 102 prior to the substrate being loaded onto the substrate chuck 104. In an alternative embodiment, the substrate coating 136 may be applied to substrate 102 while the substrate 102 is on the substrate chuck 104. In an embodiment, the substrate coating 136 may be applied by spin coating, dip coating, etc. In an embodiment, the substrate 102 may be a semiconductor wafer. In another embodiment, the substrate 102 may be a blank template (replica blank) that is used to create a daughter template after being imprinted.

The nanoimprint lithography system 100 may also include a heat irradiation light source 140. The heat irradiation light source 140 may include one or more sources of light and/or a spatial light modulator that are configured to produce a spatio-temporal distribution of heat irradiation that is adjustable. The heat irradiation light source 140 is configured to illuminate the template 108 in the template chuck 118 with the spatio-temporal distribution of heat irradiation that is absorbed by the template 108 and/or the substrate 102 such that one or both are distorted by the spatio-temporal distribution of heat irradiation. In an embodiment, the wavelength of the heat irradiation is a non-UV wavelength. It is preferable that the heat irradiation light source 140 emits heat irradiation having a wavelength at which the formable material 124 (which may be an ultraviolet curable material) is not substantially cured after being exposed to the heat irradiation. In an embodiment, the wavelength of the heat irradiation is between 400 nm to 2000 nm. In an embodiment, from the viewpoint of heating efficiency, heat irradiation in a wavelength band between 500 nm to 800 nm may be used. In an embodiment, the wavelength of the heat irradiation is infrared radiation (wavelength 750 nm-1000 μm). In an embodiment, the wavelength of the infrared radiation is tuned so as to be absorbed by one or both of template 108 and/or the substrate 102 and not the formable material 124. The template 108 may be doped, coated, and/or implanted with a material that absorbs the heat radiation. In an alternative embodiment, the heat irradiation light source 140 emits UV light which does not produce significant polymerization of the formable material 124, but does pass through the back surface 358 of the light guide plate 350, and does heat up one or both of the template 108 and the substrate 102.

The nanoimprint lithography system 100 may also include a beam combiner and/or a dichroic filter 142 that allows the visible light and the heat irradiation to be combined and guided towards the template 108.

The nanoimprint lithography system 100 may be regulated, controlled, and/or directed by one or more processors 132 (controller) in communication with one or more components and/or subsystems such as the substrate positioning stage 106, the imprint head, the fluid dispenser 122, the UV light source 126, the spread camera 128, the heat irradiation source 140, the template chuck 118, a template chuck positioning system, a fluid dispenser positioning system, and/or the droplet inspection system 138. The processor 132 may operate based on instructions in a computer readable program stored in a non-transitory computer readable memory 134. The processor 132 may be or include one or more of a CPU, MPU, GPU, ASIC, FPGA, DSP, and a general purpose computer. The processor 132 may be a purpose built controller or may be a general purpose computing device that is adapted to be a controller. Examples of a non-transitory computer readable memory include but are not limited to RAM, ROM, CD, DVD, Blu-Ray, hard drive, networked attached storage (NAS), an intranet connected non-transitory computer readable storage device, and an internet connected non-transitory computer readable storage device.

Either the imprint head, the substrate positioning stage 106, or both varies a distance between the mold 110 and the substrate 102 to define a desired volume that is filled with the formable material 124. For example, the imprint head may apply a force to the template 108 such that mold 110 is in contact with the formable material 124. The heat irradiation source 140 may be used to heat up selected portions of the template 108 and/or substrate 102 to change their shape. After the desired volume is filled with the formable material 124, the UV light source 126 produces actinic radiation (e.g. UV) causing formable material 124 to cure, solidify, and/or cross-link; conforming to a shape of the substrate surface 130 and the patterning surface 112, defining a patterned layer on the substrate 102. The formable material 124 is cured while the template 108 is in contact with formable material 124 forming the patterned layer on the substrate 102. Thus the nanoimprint lithography system 100 uses a shaping process to form the patterned layer which has recesses and protrusions which are an inverse of the pattern in the patterning surface 112. Or in the case of a featureless patterning surface 112 forms a planarized layer.

The shaping process may be done repeatedly in a plurality of imprinting fields that are spread across the substrate surface 130. Each of the imprinting fields may be the same size as the mesa 110 or just the pattern area of the mesa 110. The pattern area of the mesa 110 is a region of the patterning surface 112 which is used to imprint patterns on a substrate 102 which are features of the device or are then used in subsequent processes to form features of the device. The pattern area of the mesa 110 may or may not include fluid control features which are used to prevent extrusions. In an alternative embodiment, the substrate 102 has only one imprinting field which is the same size as the substrate 102 or the area of the substrate 102 which is to be patterned with the mesa 110. In an alternative embodiment, the imprinting fields overlap. Some of the imprinting fields may be partial imprinting fields which intersect with a boundary of the substrate 102.

Figure 2:
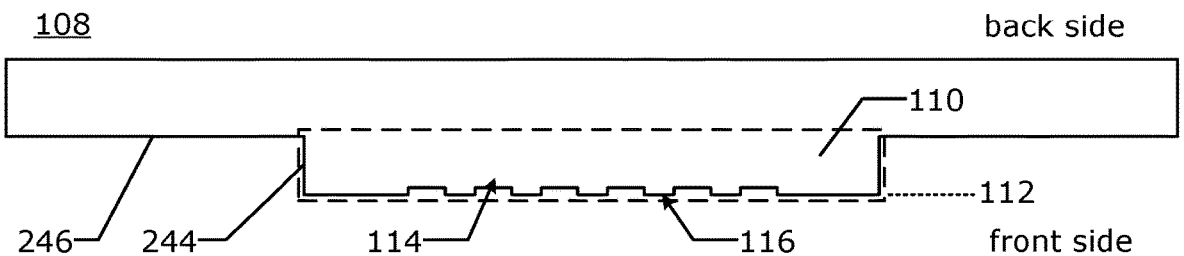
FIG. 2 is an illustration of an exemplary template that may be used in an embodiment.

The patterned layer may be formed such that it has a residual layer having a residual layer thickness (RLT) above a highest point on the substrate surface 130 in each imprinting field. The patterned layer may also include one or more features such as protrusions which extend above the residual layer having a thickness. These protrusions match the recesses 114 in the mesa 110. Template FIG. 2 is an illustration of a template 108 that may be used in an embodiment. The patterning surface 112 is on a mesa 110 (identified by the dashed box in FIG. 2). The mesa 110 is surrounded by a recessed surface 246 on the front side of the template. Mesa sidewalls 244 connect the recessed surface 246 to patterning surface 112 of the mesa 110. The mesa sidewalls 244 surround the mesa 110. In an embodiment in which the mesa is round or has rounded corners, the mesa sidewalls refer to a single mesa sidewall that is a continuous wall without corners.

UV Light Source

Figure 3A:
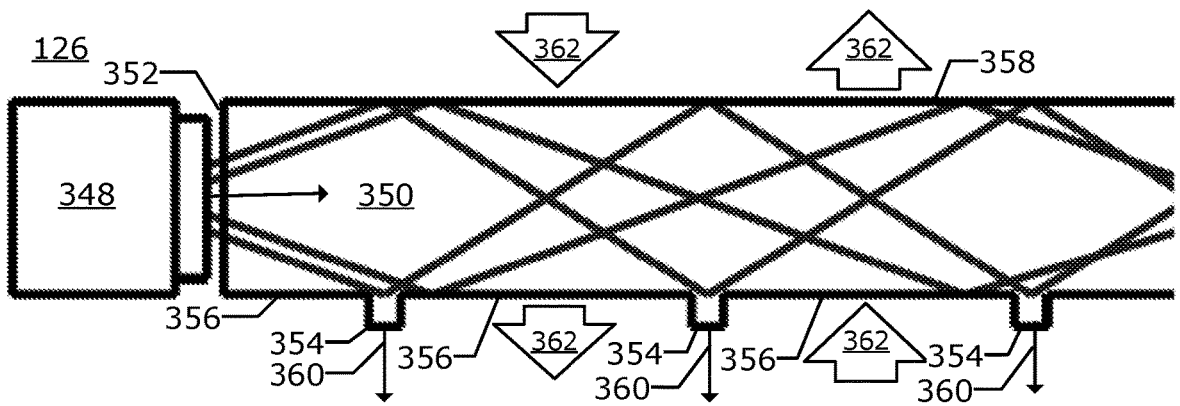
FIGS. 3A-H are illustrations of light guide plates that may be used in an exemplary embodiment.
Figure 3B:
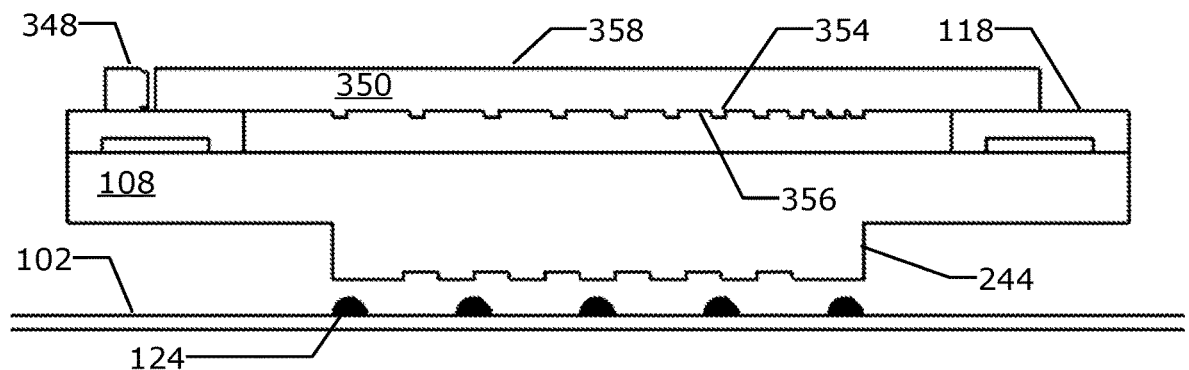

The UV light source 126 may include one or more UV LED(s) 348 to cure the imprinted formable material 124. The UV LED(s) 348 may be positioned around the perimeter of a light guide plate 350 as illustrated in FIGS. 3A-H. FIG. 3A is a cross-sectional view of the light source 126 illustrating the relative position of the UV LED(s) 348 to the light guide plate 350 as may be used in an embodiment. FIG. 3B is a cross sectional view illustrating a relative position of the light guide plate 350 to the template chuck 118. In an alternative embodiment, the UV LED(s) 348 may be positioned farther away from the template chuck 118 so as to reduce the propagation of heat from the LED(s) 348 to the template chuck 108.

The UV light guide plate 350 may have a circular, square, or other shape. The light guide plate 350 may be larger than the field being imprinted. The UV light guide plate 350 can provide a high intensity that can also be uniform or have a customizable intensity distribution which matches with the field to be imprinted. The UV light guide plate 350 may be made of Poly(methyl methacrylate) (PMMA), polycarbonate (PC), fused silica, or glass. The UV light guide plate 350 may be made of a material that has index of refraction which can guide the UV light using total internal refraction and does not absorb a significant amount of UV radiation. In an embodiment, the light guide plate does not absorb more than 30% of the UV radiation produced by UV LED(s) 348.

The UV LED(s) 348 may be situated on an input edge 352 of the light guide plate 350. The UV light 360 (illustrated as black arrows in FIG. 3A) from the UV LED(s) 348 propagate through the light guide plate 350 by total internal reflection. The light guide plate 350 may include scattering features 354 (for example: v-cuts, bumps, protrusions, indentations, and/or micro printed scattering dots) that direct and/or scatter the UV light 360 out of a light output face 356. The scattering features 354 may be located on one or both of the light output face 356 and a back surface 358. The distribution of the scattering features 354 may be adjusted to provide a uniform output across the light output face 354. In an alternative embodiment, the scattering features 354 are arranged so as to provide a non-uniform distribution that has a high intensity in the center and a lower intensity along the edge. In an embodiment, the size and/or distribution of scattering features increases as distance from the UV LED (s) increases.

Figure 3C:
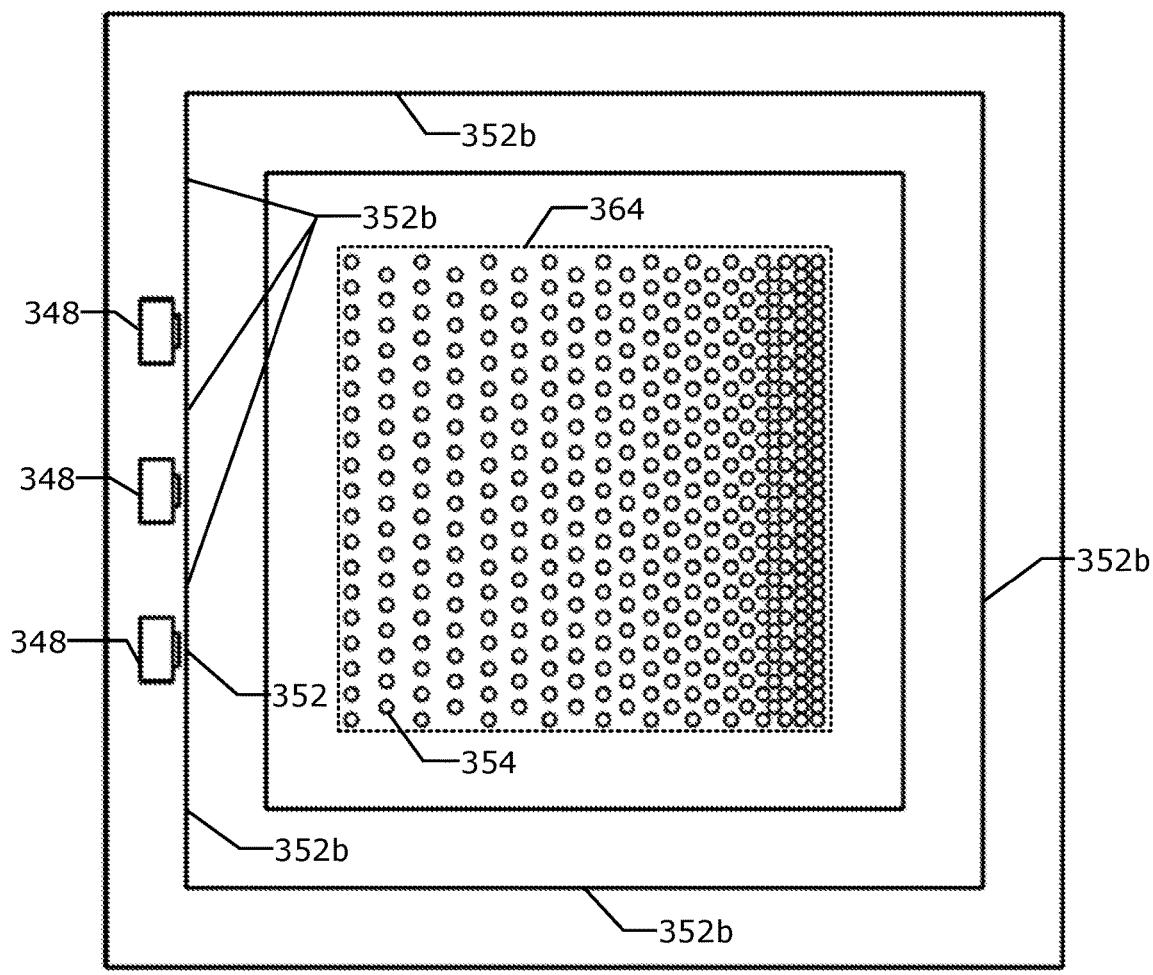

FIG. 3C is a plan view of the UV light source 126 arranged above an imprinting field 364 on the substrate 102. The edges of the imprint field 364 correspond to the mesa sidewalls 244 of the template 108. FIG. 3C illustrates an embodiment, in which the UV LED(s) 348 are positioned on one side of the light guide plate 350. FIG. 3C also illustrates an embodiment in which the scattering features 354 are arranged in a non-uniform manner so as to provide UV light 360 out of the light output face 354 with a uniform light distribution in the imprint field 364. In an embodiment, the input edge 352 is a portion of the edge surrounding the light guide plate 350 which allows UV light to enter the light guide plate, while other portions of the light guide plate 350 may have a reflective coating 352b or surface which reflects the UV light back into the light guide plate 350.

Figure 3D:
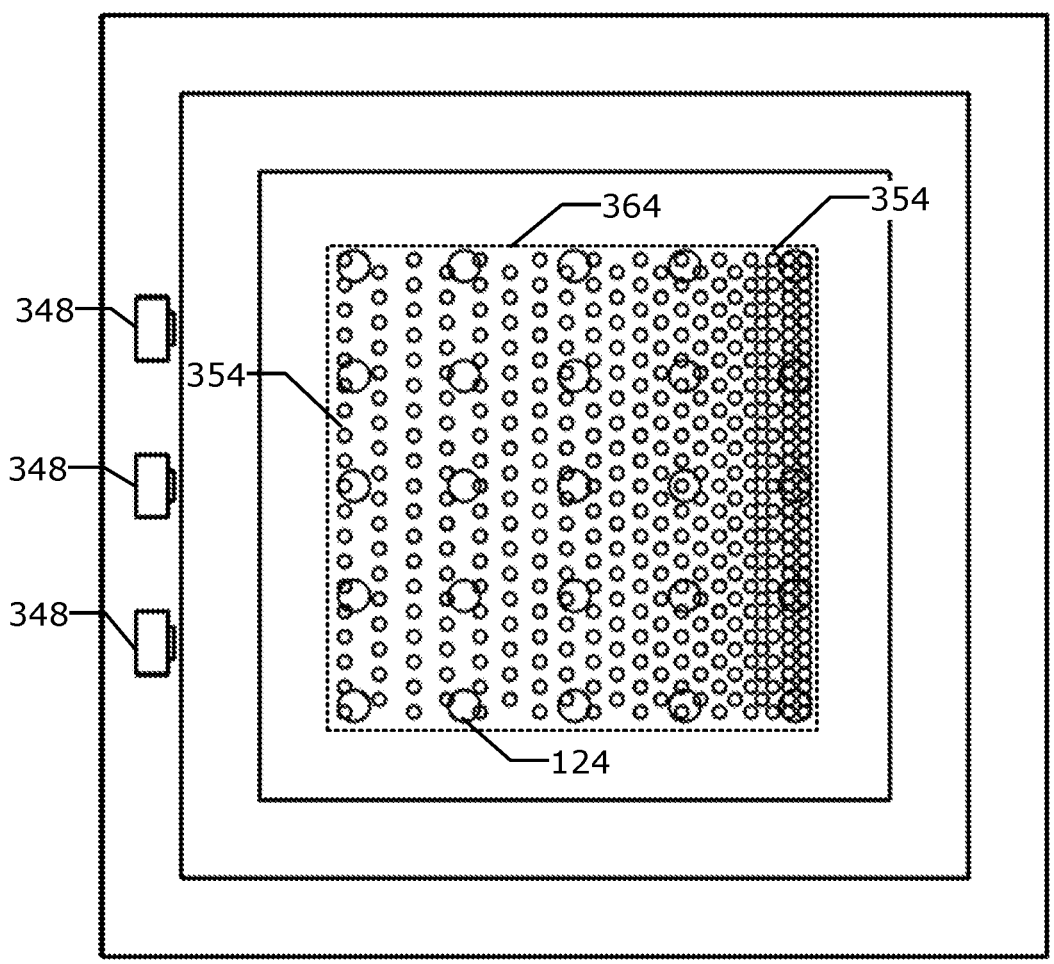

FIG. 3D is a plan view of the UV light source 126 arranged above an imprinting field 364 on the substrate 102 also showing the formable material 124 in the imprinting field 364.

The back surface 358 may have a UV reflective coating that reflects UV light while being transparent to a wavelength band of non-UV light 362. In an embodiment, the UV reflective coating is a dielectric coating. In an embodiment, the UV reflective coating is a multilayer coating. In an alternative embodiment, the back surface 358 includes a UV reflective substrate which is attached to the guiding portion of the light guide plate 126. In an embodiment, the UV reflective substrate is a long-pass filter, which allows visible light and heat irradiation to pass through it while reflecting UV light. For example the formable material 124 under the template 108 may be illuminated by visible light which is then gathered by the spread camera 128 only after it has passed through the back surface 358. The heat irradiation may also pass through the back surface 358 before it reaches the template 108 and/or substrate 102. In an alternative embodiment, side walls of the light guide plate 126 may have a UV reflective coating or substrate attached to them with openings in the coating for which UV light from the LED(s) 348 enters.

An embodiment, may include a UV LED 348 with a peak wavelength of 365 nm that is optically coupled to an input edge 352 of a PMMA light guide plate 350 with v-cut grooves 354. In an embodiment, the wavelength of the UV LED is between 300-380 nm. In an alternative embodiment, the light transmission of the light guide plate 350 is less than 40% at 365 nm. In one embodiment, the light guide plate 350 may be made of a PMMA that is tailored for UV light transmission this would drastically improve UV light transmission at 365 nm. In a preferred embodiment, the light transmission of the light guide plate 350 is greater than 80% at the peak wavelength of the UV LED 348. The UV LED 348 may be mounted to a heat sink so as to pull heat away from the light guide plate 350 and the template 102.

The density of the scattering features 354 and their distribution is determined by the shape of the field to be imprinted. In one embodiment, the layout of the scattering features 354 is designed to provide a uniform UV intensity corresponding to the field shape (not the shape of the light guide). No scattering features 354 are placed outside of the field (matches field shape) and only the area of interest is exposed. In another embodiment, the scattering features 354 are arranged to preferentially provide more intensity to a desired area (for example the center of the field) of the field than another (field perimeter).

The UV light source 126 may be compatible (does not substantially obstruct) the optical path on which the spread camera 128 is used to view the formable material 124 under the patterning surface 112 and can provide uniform UV intensity across field to be cured. The UV LED(s) 348 may be positioned close to the area to be imprinted reducing wasted irradiation, but outside the optical path of the spread camera and heat irradiation light source. Additional UV LED(s) 348 may be stacked along the input edge 352 to increase irradiance.

Figure 3E:
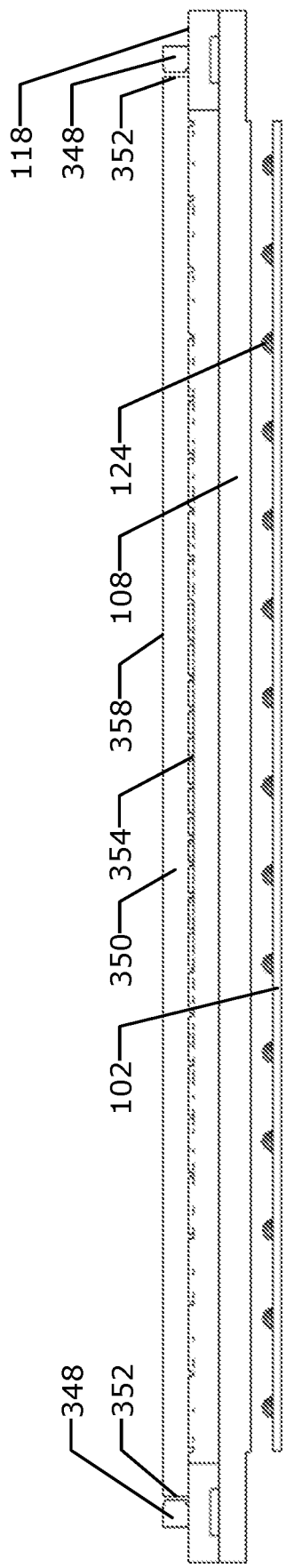
Figure 3F:
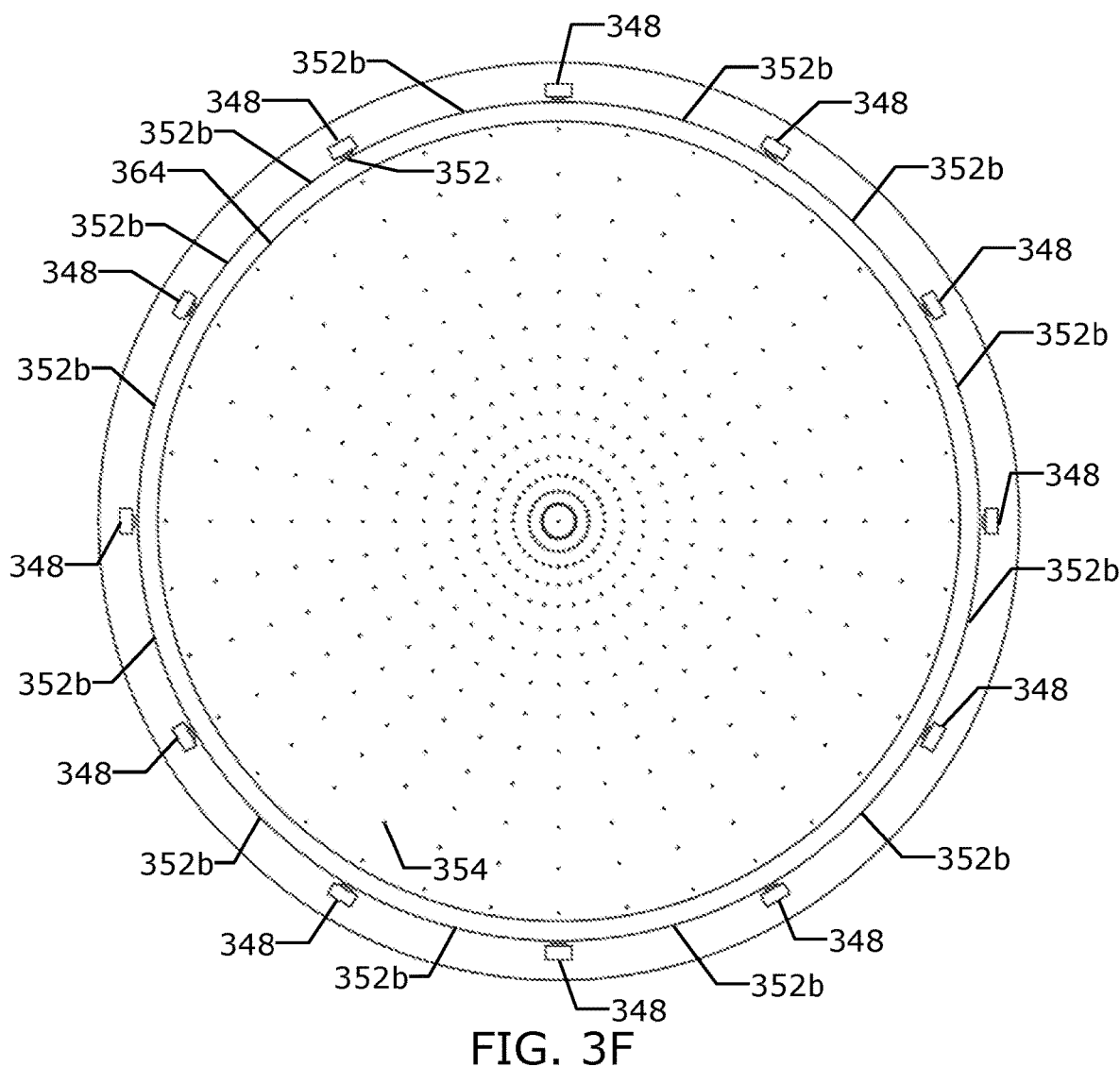

FIG. 3E is an illustration of a cross section of the UV light source arranged above a template 108 in which there is a single imprinting field on the substrate and the size of the imprinting field matches the size of the substrate 102 as illustrated in FIG. 3E. FIG. 3F is a plan view of the UV light source 126 with a circular light guide plate 350 with a plurality of UV LED(s) 348 arranged along the input edge 352 of the light guide plate 350. As illustrated in FIG. 3F the scattering features 354 are depicted to indicate a uniform UV intensity across the entire substrate 102.

Figure 3G:
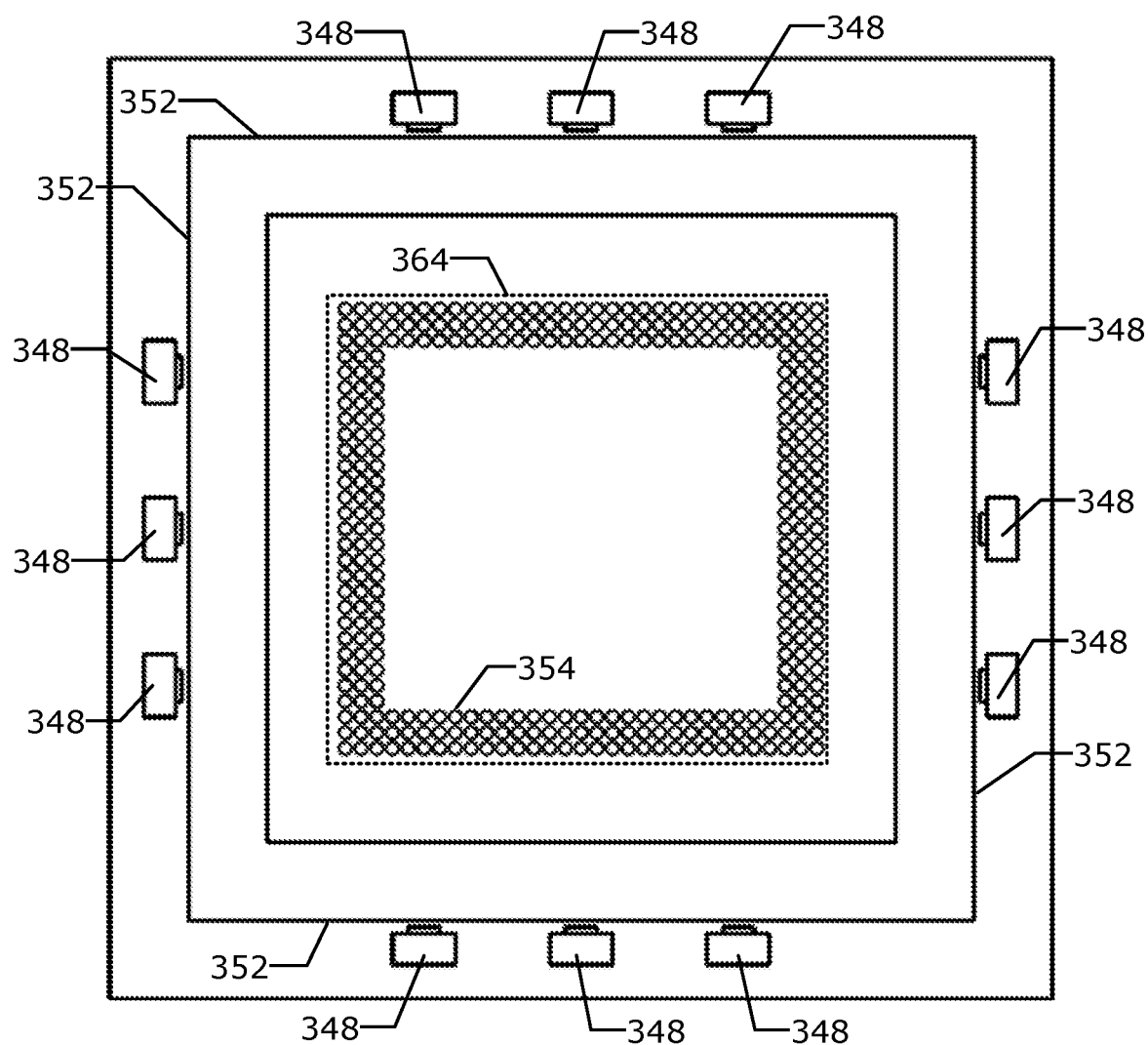

FIG. 3G is a plan view of a UV light source 126 arranged above an imprinting field 364 on a substrate 102. FIG. 3G illustrates an embodiment, in which multiple UV LED(s) 348 are arranged along multiple input edges 352 of the light guide plate 350. The light guide plate 350 may have a distribution of scattering features 354 that provide a non-uniform UV light distribution in the imprinting field. FIG. 3G illustrates an embodiment in which the scattering features provide a frame shaped UV light distribution. In an embodiment, the scattering features are arranged in a shape that corresponds to the edges of an imprint field. In an alternative embodiment, the scattering features are arranged at positions both inside and outside of the imprint field and provide frame like distribution of UV irradiation that is inside the imprint field. In an alternative embodiment, the scattering features are arranged to provide a non-uniform UV light distribution both inside and outside the imprinting field 364. In an embodiment, the scattering features 354 are configured to send UV light 360 through the patterning surface 112 of the template and not through a recessed surface 246 of the template 108. In an embodiment, the amount of light which the scattering features 354 send through the recessed surface 246 of the template is insufficient to polymerize any formable material 124 that has spread out beyond the pattering surface 112 and is now below the recessed surface 246.

Figure 3H:
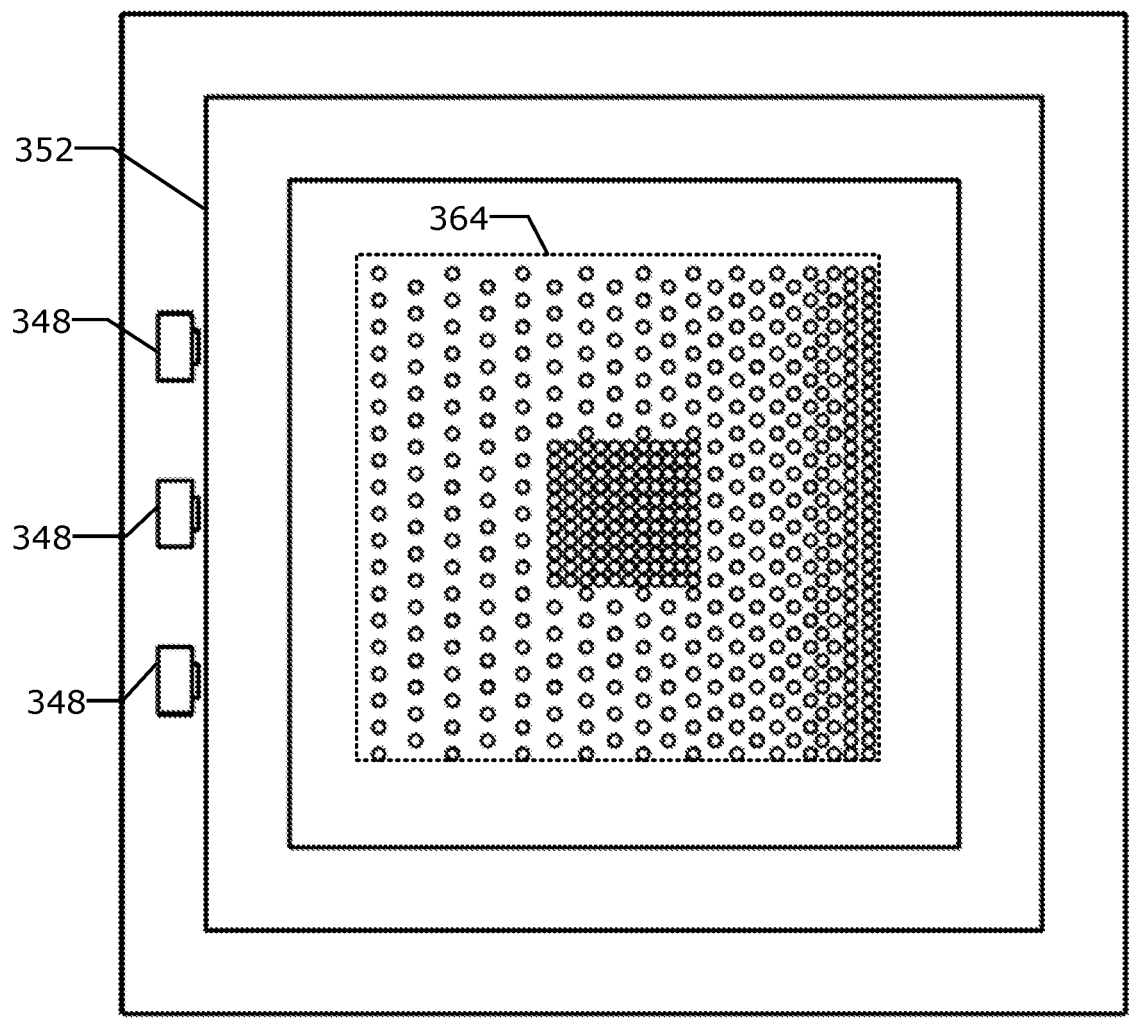

FIG. 3H is a plan view of a UV light source 126 arranged above an imprinting field 364 on a substrate 102. FIG. 3H illustrates an embodiment, in which multiple UV LED(s) 348 are arranged along an input edge 352 of the light guide plate 350. The light guide plate 350 may have a distribution of scattering features 354 that provides a non-uniform UV light distribution in the imprinting field. FIG. 3H illustrates an embodiment in which the scattering features provides UV light distribution in which the central intensity is higher than edge intensity of the UV light distribution.

In an embodiment, portions of the light output face may have a coating and/or surface that reflects UV light thus preventing UV light from exposing specific portions outside of the imprint field 364. In an embodiment, the UV light source 126 may be attached to the template chuck 118 and/or the bridge 120.

Template Chuck

In an embodiment, the template chuck 118 has an aperture that is larger or the same size as the patterning surface 112. The scattering features 354 may be positioned to direct light through the aperture in the template chuck 118.

In an embodiment, the template chuck 118 is substantially transparent to the UV light produced by the UV light source and the scattering features direct the UV light through the template chuck 118. In an embodiment, the template chuck 118 transmits at least 80% of the UV light 360 that passes out of the light output face 356 of the UV light source 126. In the context of the present application being transparent to UV light means transmitting at least 80% of the UV light produced by the UV LED(s) that is incident on a back surface of the template chuck 118 and then passes though the template chuck 118 and into the template 108.

Shaping Process

Figure 4:
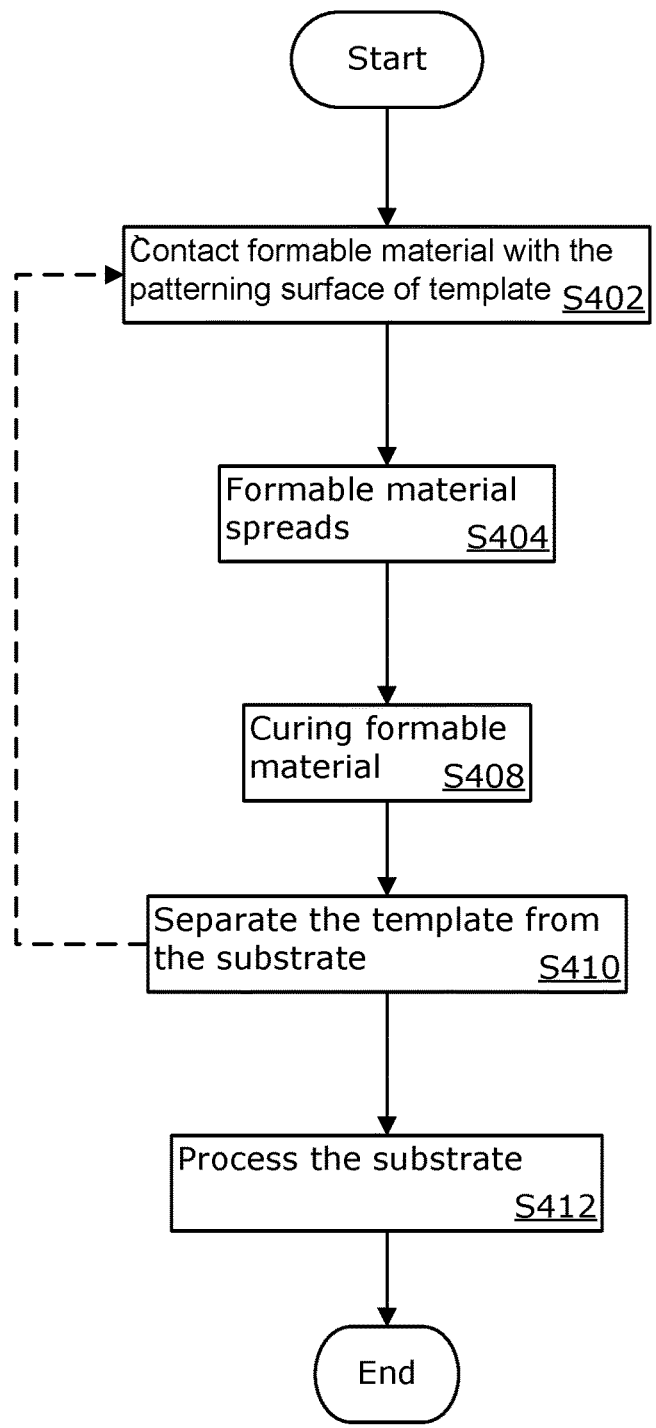
FIG. 4 is a flowchart illustrating the steps of an article manufacturing method according to an exemplary embodiment.

FIG. 4 is a flowchart of a shaping process 400 by the nanoimprint lithography system 100 that can be used to form patterns in formable material 124 on one or more imprint fields (also referred to as pattern areas or shot areas). The shaping process 400 may be performed repeatedly on a plurality of substrates 102 by the nanoimprint lithography system 100. The processor 132 may be used to control the shaping process 200.

In an alternative embodiment, the shaping process 400 is used to planarize a substrate 102. In which case, patterning surface 112 is the same size or larger than the substrate 102 and is featureless.

The beginning of the shaping process 400 may include a template mounting step causing a template conveyance mechanism to mount a template 108 onto the template chuck 118. The shaping process may also include a substrate mounting step, the processor 132 may cause a substrate conveyance mechanism to mount the substrate 102 onto the substrate chuck 104. The substrate may have one or more coatings and/or structures. The order in which the template 108 and the substrate 102 are mounted onto the nanoimprint lithography system 100 is not particularly limited, and the template 108 and the substrate 102 may be mounted sequentially or simultaneously.

In a positioning step, the processor 132 may cause one or both of the substrate positioning stage 106 and a dispenser positioning stage to move an imprinting field i (index i may be initially set to 1) of the substrate 102 to a fluid dispense position below the fluid dispenser 122. The substrate 102, may be divided into N imprinting fields, wherein each imprinting field is identified by an index i. In which N is a real integer such as 1, 10, 75, etc. $\{N \in \mathbb{Z}^+\}$. In a dispensing step, the processor 132 may cause the fluid dispenser 122 to dispense formable material onto imprinting field i. In an embodiment, the fluid dispenser 122 dispenses the formable material 124 as a plurality of droplets. The fluid dispenser 122 may include one nozzle or multiple nozzles. The fluid dispenser 122 may eject formable material 124 from the one or more nozzles simultaneously. The imprint field i may be moved relative to the fluid dispenser 122 while the fluid dispenser is ejecting formable material 124. Thus, the time at which some of the droplets land on the substrate may vary across the imprint field i.

In an alternative embodiment, the formable material 124 is dispensed onto the substrate 102 prior to the substrate 102 being mounted on the substrate chuck 104. Other methods besides drop dispense may be used to deposit the formable material 124 onto the substrate 102, such as spin coating, dip coating, spray coating, etc.

After, the droplets are dispensed, then a contacting step S402 may be initiated, the processor 132 may cause one or both of the substrate positioning stage 106 and a template positioning stage to bring the patterning surface 112 of the template 108 into contact with the formable material 124 in imprinting field i.

During a spreading step S404, the formable material 124 then spreads out towards the edge of the imprinting field i and the mesa sidewalls 244. The edge of the imprinting field may be defined by the mesa sidewalls 244. How the formable material 124 spreads and fills the mesa can be observed via the spread camera 128 and may be used to track a progress of the fluid front by gathering light that has passed through the back surface 358. In an alternative embodiment, formable material spreads towards the edge of the substrate 102.

In a curing step S408, the processor 132 may send instructions to the UV light source 126 to send a curing illumination pattern of actinic radiation through the light output face 356, template 108, and the patterning surface 112. The curing illumination pattern provides enough energy to cure (polymerize) the formable material 124 under the patterning surface 112.

In a separation step S410, the processor 132 uses one or both of the substrate positioning stage 106 and a template positioning stage to separate the patterning surface 112 of the template 108 from the cured formable material on the substrate 102.

If there are additional imprinting fields to be imprinted then the process moves back step S402. In an embodiment, additional processing is performed on the substrate 102 in a processing step S412 so as to create an article of manufacture (semiconductor device). In an embodiment, each imprinting field may include a plurality of devices.

The further processing in processing step S412 may include etching processes to transfer a relief image into the substrate that corresponds to the pattern in the patterned layer. The further processing in processing step S228 may also include known steps and processes for article fabrication, including, for example, curing, oxidation, layer formation, deposition, doping, planarization, etching, formable material removal, dicing, bonding, and packaging, and the like. The substrate 102 may be processed to produce a plurality of articles (devices).

Further modifications and alternative embodiments of various aspects will be apparent to those skilled in the art in view of this description. Accordingly, this description is to be construed as illustrative only. It is to be understood that the forms shown and described herein are to be taken as examples of embodiments. Elements and materials may be substituted for those illustrated and described herein, parts and processes may be reversed, and certain features may be utilized independently, all as would be apparent to one skilled in the art after having the benefit of this description.

What is claimed is:

1. A light source comprising:
   one or more actinic energy sources; and
   a light guide plate that has at least: a light output face; an input edge; and a back surface facing opposite the light output face;
   wherein the input edge of the light guide plate is arranged to receive UV light from the one or more actinic energy sources;
   wherein the light guide plate has a plurality of scattering features that are configured to scatter UV light received from the input edge;
   wherein the scattering features are on both of the light output face and the back surface;
   wherein the back surface reflects UV light towards the light output face and is transparent to non-UV light.

2. The light source according to claim 1, wherein the light guide plate is circular;
   wherein the one or more actinic energy sources includes a plurality of actinic energy sources that are uniformly distributed around a circular input edge of the light guide plate; and
   wherein the scattering features are arranged radially to output a uniform UV intensity across the light output face.

3. The light source according to claim 1, wherein the light guide plate has multiple input edges;
   wherein the one or more actinic energy sources includes a plurality of actinic energy sources arranged along each of the input edges; and
   wherein the scattering features are arranged to output a frame shaped UV light distribution.

4. A light source comprising:
   one or more actinic energy sources; and
   a light guide plate that has at least: a light output face; an input edge; and a back surface facing opposite the light output face;
   wherein the input edge of the light guide plate is arranged to receive UV light from the one or more actinic energy sources;
   wherein the light guide plate has a plurality of scattering features that are configured to scatter UV light received from the input edge;
   wherein the back surface reflects UV light towards the light output face and is transparent to both visible light and heat irradiation.

5. A shaping system comprising:
   a template chuck configured to hold a template;
   a substrate chuck configured to hold a substrate;
   a positioning system configured to bring the template into contact with formable material in an imprinting field on the substrate; and a light source comprising:
  one or more actinic energy sources; and
  a light guide plate that has at least: a light output face; an input edge; and a back surface facing opposite the light output face;
  wherein the input edge of the light guide plate is arranged to receive UV light from the one or more actinic energy sources;
  wherein the light guide plate has a plurality of scattering features that are configured to scatter UV light received from the input edge; and
  wherein the back surface reflects UV light towards the light output face and is transparent to non-UV light; and
wherein the scattering features on the light guide plate are configured to send UV light towards the formable material on the substrate; and
wherein a distribution of the plurality of scattering features are arranged to provide a distribution of the UV light exiting the light output face that matches with the imprinting field.

6. The shaping system according to claim 5, wherein:
the template chuck includes an opening that is the same size or larger than a patterning surface of the template; and
the scattering features are configured to send the UV light through the opening in the template chuck.

7. The shaping system according to claim 5, further comprising:
a spread camera positioned to receive visible light from the formable material under the template which has passed through the light output face and the back surface of the light guide plate;
a heat irradiation light source that is configured to produce a heat irradiation pattern which is guided through both the back surface of the light guide plate, and the light output face of the light guide plate, and is absorbed by one or both of the template held in the template chuck and the substrate held in the substrate chuck.

8. The shaping system according to claim 7, wherein the heat irradiation light source is configured to adjust a spatio-temporal distribution of heat irradiation.

9. The shaping system according to claim 5, wherein the arrangement of the scattering features provides for transmission of a lower intensity of UV light at a center of the retained substrate and a relatively higher intensity of UV light at a periphery of the retained substrate.

10. The shaping system according to claim 5, wherein the distribution of the scattering features are in a shape that corresponds to edges of the imprinting field, wherein edges of the imprinting field on the substrate correspond to mesa sidewalls of the template when the template is brought into contact with the formable material.

11. The shaping system according to claim 5, wherein a patterning surface of the template is featureless; and
  wherein the formable material forms a planarized layer in the imprinted field upon receiving the UV light exiting the light output face.

12. The shaping system according to claim 5, wherein the imprinting field of the substrate is the same size as the substrate.

13. The shaping system according to claim 5, wherein the light guide plate is circular;
  wherein the one or more actinic energy sources includes a plurality of actinic energy sources that are uniformly distributed around a circular input edge of the light guide plate; and
  wherein the scattering features are arranged radially to output a uniform UV intensity onto the formable material on the substrate.

14. The shaping system according to claim 5, wherein the light guide plate has multiple input edges;
  wherein the one or more actinic energy sources includes a plurality of actinic energy sources arranged along each of the input edges; and
  wherein the scattering features are arranged to output a frame shaped UV light distribution.

15. The shaping system according to claim 14, wherein the frame shaped UV light distribution is inside the imprinting field, wherein edges of the imprinting field on the substrate correspond to mesa sidewalls of the template when the template is brought into contact with the formable material.

16. The shaping system according to claim 15, wherein the scattering features are arranged at positions both inside and outside of the imprinting field.

17. The shaping system according to claim 5, wherein a patterning surface of the template has recesses and protrusions;
  wherein the formable material forms a patterned layer in the imprinted field upon receiving the UV light exiting the light output face; and
  wherein patterned layer is an inverse of the recesses and protrusions of the patterning surface.

18. The shaping system according to claim 5, wherein the scattering features are on both of the light output face and the back surface.

19. The shaping system according to claim 5, wherein the back surface reflects UV light towards the light output face and is transparent to both visible light and heat irradiation.

20. A method of manufacturing an article comprising:
  contacting formable material on an imprinting field of a substrate with a template;
  providing a light guide plate that has at least: a light output face; an input edge; and
  a back surface facing opposite the light output face, wherein the back surface is transparent to non-UV light;
  producing UV light with one or more actinic energy source, which is then received by the input edge of the light guide, then scattered by a plurality of scattering features of the light guide, reflected off the back surface of the light guide, out of the light output face of the light guide, thru the template, and is absorbed by the formable material;
  wherein a distribution of the plurality of scattering features are arranged to provide a distribution of the UV light exiting the light output face that matches with the imprinting field;
  separating the template from the cured formable material; and
  processing the substrate on which the cured formable material has been formed to manufacture the article.

* * * * *